United States Patent

[11] 3,626,104

[72] Inventors Marc Jean Pierre Leger
Issy-les-Moulineaux;
Claude Paul Henri Lerouge, Maurepas;
Marc Andre Regnier, Aulnay-sous-Bois, all of France
[21] Appl. No. 834,673
[22] Filed June 19, 1969
[45] Patented Dec. 7, 1971
[73] Assignee International Standard Electric Corporation
New York, N.Y.
[32] Priority June 25, 1968
[33] France
[31] 156405

[54] SWITCHING STAGE WITH MOS CROSSPOINTS
6 Claims, 17 Drawing Figs.

[52] U.S. Cl. .......... 179/18 FH
[51] Int. Cl. .......... H04q 3/00
[50] Field of Search .......... 179/18 GF

[56] References Cited
UNITED STATES PATENTS

| | | | |
|---|---|---|---|
| 3,193,621 | 7/1965 | Lummis .......... | 179/18 FG |
| 3,270,139 | 8/1966 | Benmussa et al. .......... | 179/18 E |
| 3,489,856 | 1/1970 | Brightman .......... | 179/18 GF |

*Primary Examiner*—William C. Cooper
*Attorneys*—C. Cornell Remsen, Jr., Walter J. Baum, Paul W. Hemminger, Charles L. Johnson, Jr., Delbert P. Warner, James B. Raden and Marvin M. Chaban

ABSTRACT: A switching stage is provided which employs multiselectors formed by MOS crosspoints. The operations of path search, subscriber test and call detection are made by a cyclic exploration of all the possible paths betw een a junctor and one (or all) subscriber(s). The supervision data ("off-hook" condition and "path established" condition) are obtained by monitoring the DC levels on the two speech conductors.

Inventor
M.J.P. LEGER C.P.H. LEROUGE
M.A. REGNIER
By D.O. Warner
Attorney

SWITCHING STAGE WITH MOS CROSSPOINTS

The present invention concerns a switching stage comprising electronic multiselectors, the contacts of which are constituted by metal-oxide silicon field-effect transistors or MOS transistors and more generally by active quadripoles crosspoints which can be realized in large-scale integrated circuits. Besides, the present invention concerns also a particular way of carrying out elementary operations in a switching stage, these operations being—in the case of a telephone central exchange—path release, the path search, the call detection and called subscriber's test.

In the French patent and the applications for certificates of addition to said patent which are listed hereafter, several examples of achievement of an elementary multiselector carried out in integrated circuits have been described. These applications, deposited by the applicant and entitled "Electronic Multi-Selector" are:

a. Patent application No. PV 131 905 deposited on 12th Dec. 1967 (M. J. P. Leger—C. P. H. Lerouge—J. H. Dejean 3-10-16, now French Pat. No. 1,555,813, corresponding to U.S. Pat. application No. 788,114 filed Dec. 5, 1968.

b. First patent of addition certificate No. PV 150 086 deposited on 30th Apr. 1968 (P. Girard—M. J. P. Léger—C. P. H. Lerouge—J. H. Déjean 10–4–14–17)

c. Second patent of addition certificate No. PV 152 195 deposited on 17th May 1968 (J. M. Hennes—M. J. P. Léger—C. P. H. Lerouge 1–5–15).

In the present invention, elementary multiselectors of the types described are grouped according to lines and columns in order to obtain multiselectors having relatively large capacities (for instance, from 64 to 256 cross-points) and which are assembled in such a way as to constitute several selection stages.

If the switching stage comprises $n$ selection stages, a path between a subscriber's line and a junctor comprises $n$ MOS transistors connected in series which are coupled to these equipments via bipolar transistors. Since the reverse voltage transfer ratio $h12$ of these transistors is extremely low, such a path can assure only an unidirectional transmission, and each contact element located at a cross-point must comprise two transistors MOS in order to assure the bidirectional transmission of the speech signals.

In the present invention, these two paths are used for signaling one being used for transmitting a signal meaning that the subscriber's set is either on-hook or off-hook, and the other being used for transmitting a signal characterizing the fact that a path is set up between a given input equipment (subscriber's line) and output equipment (junctor).

The two contact elements associated with each cross-point are placed in a switching circuit comprising the following output conductors:

Vertical selection conductor $d$,
Horizontal selection conductor $s$,
Line conductor $e$.

In a multiselector, the conductors $d$ of all the switching circuits associated to a vertical $j$ are connected together and are brought to one of the two potentials characterized by the logical condition D or $\overline{D}$ and the conductors $s$ ($e$) of all the switching circuits associated to an horizontal $k$ are connected together and are brought to one of the two potentials characterized by the logical condition S or $\overline{S}$ (E or $\overline{E}$).

The control of the switching circuit X$jk$ placed at the intersection of the vertical $j$ and of the horizontal $k$ is carried out as follows:

a. Horizontal selection: a selection signal $\overline{S}$ is applied to the conductor $s$;

b. Opening of the contacts: a signal D is applied to the conductor $d$;

c. Closing of the contacts, which can take place only if a free line signal E is present: the vertical selection conductor potential is switched; the signal D being replaced by the signal $\overline{D}$. When the contacts are closed, a busy signal $\overline{E}$ appears on the line conductor $e$.

In a switching stage according to the invention and comprising several selection stages, the speech and line conductors of each horizontal of a stage T$p$ are connected to the speech and selection conductors of a vertical of the preceding stage T($p$–1. It results therefrom that the switching of potential over the conductor $e$ of the circuit X$jk$ constitutes the closing signal applied to the vertical of the stage T($p$–1) to which this conductor is connected and that a path is set up through the switch by the closing in cascade of $n$ switching circuits (one circuit per selection stage) if the corresponding horizontals selected previously by signals $\overline{S}$, are free.

The various elementary operations stated hereabove are performed, in each of the selection stages, either by the selection of a given horizontal, or by a cyclic selection of all the horizontals, this latter operation enabling to test all the possible paths connecting the stage T$p$ to the stage T($p$–1).

The object of the present invention is thus to realize a switching stage equipped with electronic multiselectors.

A feature of the invention is that each multiselector is realized by the association, along verticals and horizontals, of a plurality of elementary multiselectors, each one comprising several switching circuits in matrix arrangement, that each switching circuit comprises two MOS transistors as contact elements placed between two horizontal speech conductors, and two vertical speech conductors and that each of said circuits comprises, as output conductors, a vertical selection conductor $d$, an horizontal selection conductor $s$, and a line conductor $e$.

Another feature of the invention is that in a multiselector, the conductors $d$ of all the circuits associated to a vertical $j$ are connected together and are brought to one of two potentials characterized by the logical conditions D and $\overline{D}$, that the conductors $s$($e$) of all the circuits associated to an horizontal $k$ are connected together and are brought to one of two potentials characterized by the logical conditions S and $\overline{S}$ (E and $\overline{E}$), that, in order to close the switching circuit X$jk$, first one carries out the selection of the horizontal $k$ by applying a signal $\overline{S}$ to the conductor $s$, second, one opens all the circuits associated to the vertical $j$ by applying a signal D to the conductor $d$, third, one switches the potential applied on this conductor by replacing the signal D by a signal $\overline{D}$, which closes the circuit S$jk$ if a signal E is present on the conductor $e$, this signal characterizing the fact that no circuit at all is closed on the conductor $k$ and that a signal $\overline{E}$ appears on this conductor, upon the closing of this circuit, the signals D and E ($\overline{D}$ and $\overline{E}$) having the same amplitude.

Another feature of the invention is that the switching stage comprises, in the case of a telephone exchange, an input stage T$x$ which groups the subscribers' lines, three selection stages T$a$, T$b$, T$c$, assuring the traffic concentration and an output stage T$y$ grouping the junctors, that the speech and line conductors of each horizontal of one stage, T$c$ for instance, are connected respectively to the vertical selection and speech conductors of one vertical of the preceding stage T$b$ so that the switching of the potential over the conductor $e$ of the circuit X$jk$ (passage from E to $\overline{E}$) constitutes the closing signal applied to the vertical of the stage T$b$ to which this conductor is connected, and that a path is set up automatically through the switching stage if the corresponding horizontals, previously selected by signals $\overline{S}$, are free.

Another feature of the invention is that each selection stage comprises several identical multiselectors the homologous horizontal selection conductors of which are connected together and receive their signals from decoders associated to three counters, K$a$, K$b$, K$c$ and that the two speech conductors are used for obtaining, in each junctor such as V$z$, signalling informations R$a$ and R$b$ characterizing the fact that, respectively, the input equipment identified by the codes stored in the counters K$a$, K$b$ is in the "off hook" condition and that a path is set up between the subscriber identified by these codes and the junctor V$z$.

Another characteristic of the invention lies upon the fact that for the path searching and for the subscriber's line test which consist in searching, starting from a junctor Vz, a path between this junctor and a subscriber identified by the codes stored in the counters Ka, K*b* one scans all of the possible paths by a cyclic advance of the counter Kc, that at each position of the counter a path may be set up in cascade through the stages Tc, T*b*, T*a*, if the selected horizontals are free, and that, when such a path is set up, the logical conditions of end of operation are the condition R*b* for the search of a path and the condition R*b*, R*a* for the subscriber's line test.

Another feature of the invention is that, for the call detection, the counters K*a*, K*b*, K*c* are connected in series and receive signals which control their cyclic advance so that all the input equipments are explored successively from the junctor Vz and that the apparition of a signal $\overline{Ra}$ indicates that the equipment identified by the codes stored in the counters K*a* and K*b* is calling.

The above-mentioned and other features and objects of this invention will become apparent by reference to the following description taken in conjunction with the accompanying drawings in which.

FIGS. 8*a* to 8*j* represent diagrams of signals.

The mode of operation of a switching circuit and the organization of a multiselector matrix, such as they have been described in the application for a patent of addition referenced (b) hereabove will be first described.

Figures 1, 2, 5:
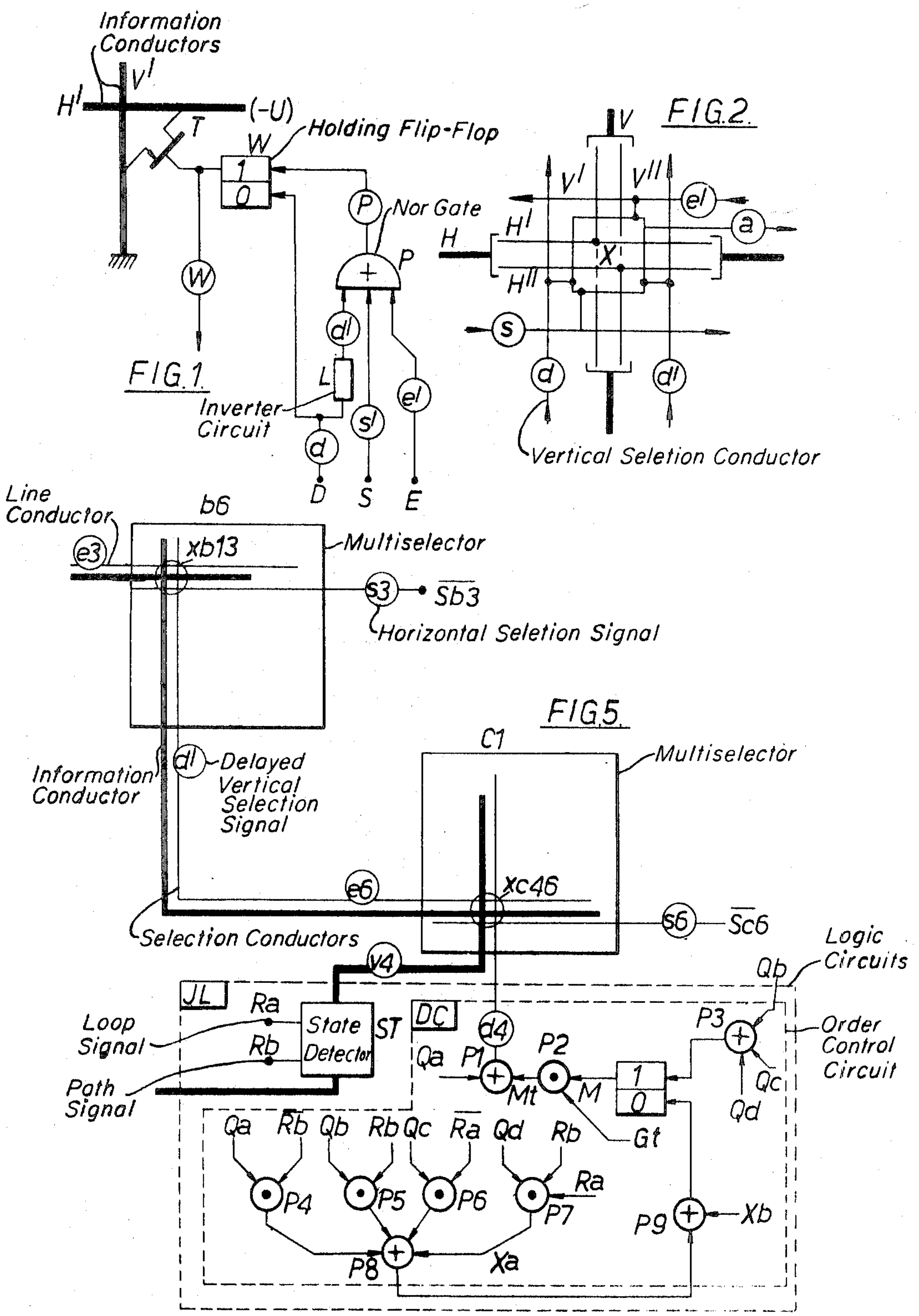
FIG. 1 represents a MOS transistor switching circuit.
FIG. 2 represents a symbolic diagram of this circuit.
FIG. 5 represents the logical circuit of a junctor.

FIG. 1 represents this switching circuit wherein all the components are, by way of a non limitative example. MOS transistors and which comprises:

The MOS-P*h* transistor referenced T which acts as a contact between the information conductors H' and V', The holding flip-flop W the 1 outlet of which is connected to the grid of the transistor T and to the conductor *w*. It is also realized with MOS-P*h* transistors and it either blocks or makes conductive this transistor according to whether it is in the 0 or 1 state. This flip-flop is reset to the O state by a signal D applied to the conductor *d*.

The three-input NOR gate P connected to the conductors *d'*, *s'*, *e'* and which controls the setting to the 1 state of the flip-flop W when signals $\overline{D}'$ $\overline{S}$, $\overline{E}'$ are applied respectively to these conductors, viz in logical notation:

$$P=\overline{D'+S+E'}=\overline{D'},\ \overline{S}\cdot\overline{E'}$$

The signal D' is obtained from the signal D inverted by the circuit L and one uses the fact that there exists a slight delay *to* between these two signals, which is due to the rise time of the signal in the circuit L.

represents a multiselector comprising *n* horizontals H1, H2...H*n* and *m* verticals V1, V2...V*m*. A switching circuit has been placed at each cross-point, those associated to the horizontal H1 being referenced X11, X21...X*m*1 and those associated to the vertical V1 being referenced X11, X12...X1*n*.

The matrix comprises besides a logical circuit per horizontal, viz for the horizontal H1, the circuit G1 comprising the NOR-circuit G'1 and the inverter G"1. The circuit G'1 comprises *m* inputs W11, W21...W*m*1 connected to the conductors W (output 1 of the flip-flops W, FIG. 1) of the switching circuits associated to the horizontal H1. It is thus seen that:

The circuit G'1 delivers over the conductor *e*1 a signal E1 for the logical condition: $E1=\overline{W11+W21+...Wm1}$.

The circuit G"1 delivers over the conductor *e'*1 a signal E'1 for the logical condition: $E'1=W11+...Wm1$.

The presence of the signals *E'*1 and $\overline{E}1$ thus means that at least one switching circuit associated to the horizontal H1 is closed. These signals will be called *busy signals* and the signals $\overline{E'1}$ and E1 will be called *free signals*.

The table I herebelow groups the various signals applied to the control conductors of a switching circuit. It will be noted that the vertical selection signal is the normal signal D whereas the horizontal selection signal is the complemented signal $\overline{S}$.

TABLE I.—CONTROL AND BUSY SIGNALS

| Conductor | Signal | Voltage | |
|---|---|---|---|
| d | $\overline{D}$ | 0 | |
| | D | −U | Vertical selection signal. |
| d' | $\overline{D}'$ | 0 | Delayed vertical selection signal. |
| | D' | −U | |
| s | $\overline{S}$ | 0 | Horizontal selection signal. |
| | S | −U | |
| e' | $\overline{E}'$ | 0 | Free signals. |
| e | E | −U | |
| e' | E' | −U | Busy signals. |
| e | $\overline{E}$ | 0 | |

We shall now briefly describe, with the help of table II, the method of control of the switching circuit X*jk* placed at the intersection of the vertical V*j* and of the horizontal H*k*. We shall assume that the cell is initially in the state of rest, i.e. that signals $\overline{Dj}$ and S*k* are applied to the selection conductors and that the horizontal H*k* is free, i.e. that a signal $\overline{E'k}$ is applied to the conductor *e'k* (see table II, line *a*).

The control of the closing of the circuit X*jk* is carried out by performing successively the following operations:

1—Horizontal selection (see table II, line *b*): A voltage −U is applied to all the conductors *s*1 to *sn* with the exception of the conductor *sk* which must be grounded (signal $\overline{Sk}$). Since a signal D'*j* is present, the gate P*jk* of the circuit S*jk* is blocked and the flip-flop W*jk* of the circuit X*jk* does not switch (see FIG. 1).

2—Vertical selection (see table II, line *c*): A signal D*j* is applied to the vertical selection conductor *dj* so that the flip-flop W*jk* receives a signal of resetting to the 0 state (condition $\overline{Wjk}$) as well as all the other flip-flops associated to the vertical V*j*. After a delay *to*, the circuit L*j* delivers a signal $\overline{D'j}$ and, since the horizontal is free (signal $\overline{E'k}$ and selected (signal $\overline{Sk}$) the gate P*jk* is energized (signal P*jk*). The flip-flop W*jk* receives thus a signal on its two control inputs and remains in the 0 state.

3—Closing of the cross-point: The signal D*j* (condition $\overline{Dj}$) is suppressed but the signal $\overline{D'j}$ is still present during a time *to*. The gate P*jk* remains thus energized so that the flip-flop W*jk* sets to the 1 state (table II, line *d*) so that both transistors TABLE II.—CONTROL OF THE SWITCHING CIRCUIT Xjk

| | | Conductors | | | | | |
|---|---|---|---|---|---|---|---|
| | Operation | d | d' | s | e' | p | Flipflop W |
| a | Rest | $\overline{Dj}$ (0) | D'j (−U) | Sk (−U) | $\overline{E'k}$ (0) | $\overline{Pjk}$ | Wjk or $\overline{Wjk}$ |
| b | Horizontal selection | $\overline{Dj}$ (0) | D'j (−U) | $\overline{Sk}$ (0) | $\overline{E'k}$ (0) | $\overline{Pjk}$ | Wjk or $\overline{Wjk}$ |
| c | Vertical selection | Dj (−U) | $\overline{D'j}$ (0) | $\overline{Sk}$ (0) | $\overline{E'k}$ (0) | Pjk | →$\overline{Wjk}$ |
| d | Closing | $\overline{Dj}$ (0) | $\overline{D'j}$ (0) | $\overline{Sk}$ (0) | $\overline{E'k}$ (0) | Pjk | →Wjk |
| e | Holding | $\overline{Dj}$ (0) | D'j (−U) | $\overline{Sk}$ or Sk | E'k (−U) | $\overline{Pjk}$ | Wjk |

FIG. 2 is a logical representation of the switching circuit X just described. This circuit enables to control, through the flip-flop W, two contact transistors enabling to set up a bidirectional connection using for one direction of transmission the conductors H', V', and for the other direction, the transistors H", V".

Figure 3:
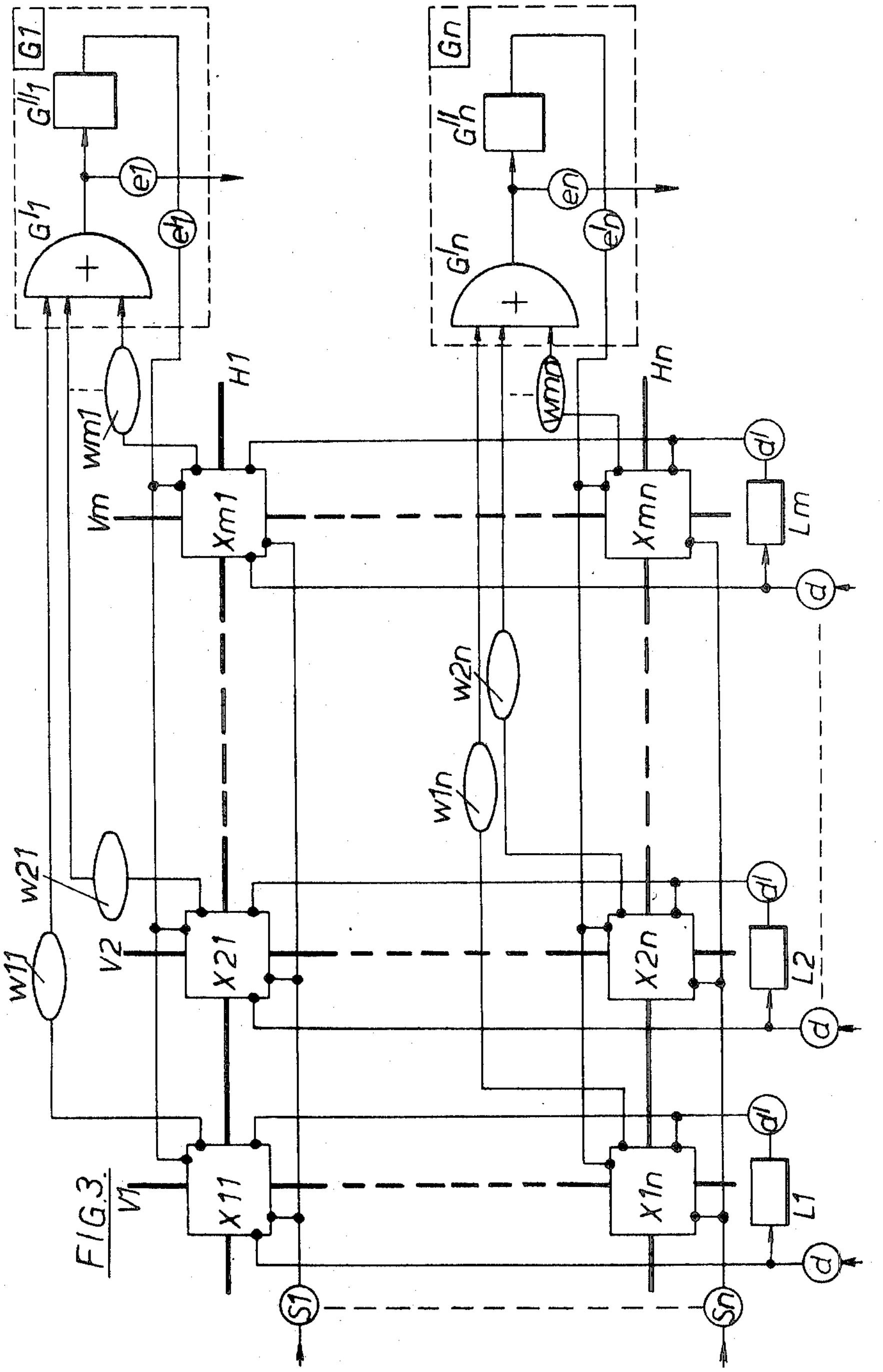
FIG. 3 represents a complete matrix of multiselector.

By a grouping of such circuits along verticals and horizontals, one achieves elementary multiselectors in large-scale integrated circuits comprising, for instance, 4×2, 4×4, 4×8, etc....switching circuits. These elementary multiselectors may be grouped similarly for constituting multiselectors of the size which is required in a telephone exchange. Thus, FIG. 3 which act as contacts are conducting: the switching circuit is closed.

After a time *to*, a signal D'*j* appears, which blocks the gate P*jk* and the circuit remains closed (table II, line *e*).

4—End of operation: A modification of the state of the circuit X*jk* can only take place afterwards if a signal Dj is applied. One may thus allow the application of the signal $\overline{Sk}$ as long as a new circuit has not to be selected in the matrix.

After having recalled the constitution and the operation of a multiselector including MOS transistor switching circuits, we shall describe a telephone exchange according to the invention, which comprises a switching stage wherein the switching circuits are controlled by orders Q*a*, Q*b*, Q*c*, Q*d* (see table V, columns *a* and *b*) delivered by the centralized control circuit CP, the organization of this circuit being such as one single order is performed at a time.

Figure 4:
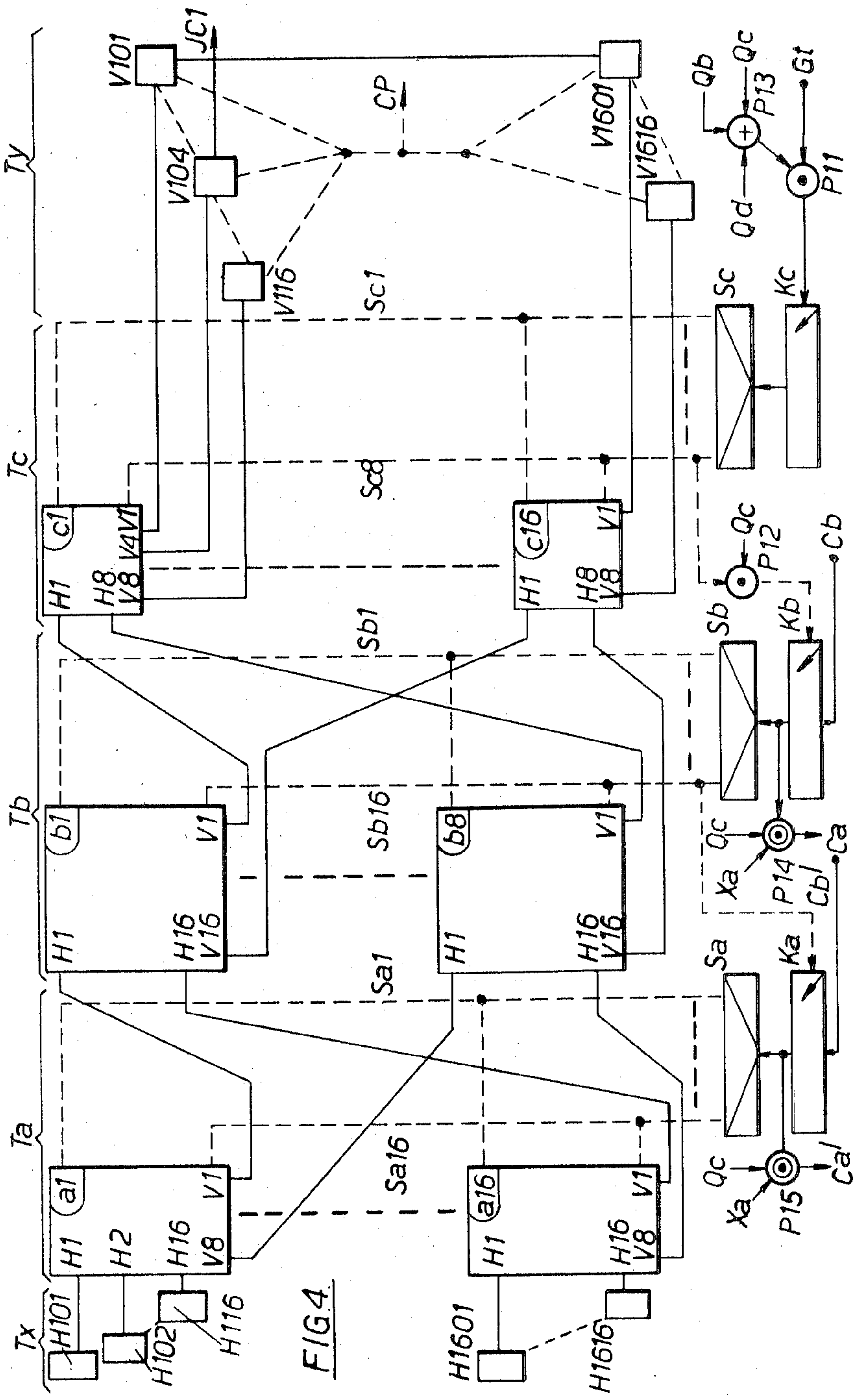
FIG. 4 represents an example of a switching stage.

FIG. 4 represents such a switching stage and table III describes its composition.

TABLE III.—COMPOSITION OF THE SWITCHING STAGE

| Stages | Composition | Horizontal selection signals |
|---|---|---|
| Input stage Tx | 256 subscribers' sets H101, H102 . . . H116 . . . H601 . . . H1616. | |
| First selection stage Ta. | 16 Multiselectors a1, a2 . . . a16 comprising each 16 horizontals and 8 verticals. | Sa1, Sa2 . . . Sa16 |
| Second selection stage Tb. | 8 multiselectors b1, b2 . . . b8 comprising each 16 horizontals and 16 verticals. | Sb1, Sb2 . . . Sb8 |
| Third selection stage Tc. | 16 multiselectors c1, c2 . . . c16 comprising each 8 horizontals and 8 verticals. | Sc1, Sc2 . . . Sc8 |
| Output stage Ty | 128 junctors V101 . . . V104 . . . V116 . . . V1601 . . . V1616. | |

The links between the various selection stages are connected in a well-known way. Thus the horizOntals H1 to H16 of the multiselector *b* 1 are connected to the verticals V1 of the multiselectors *a*1 to *a*16, the horizontals of the multiselector *b*2 are connected to the verticals V2 of the multiselectors *a*1 to *a*16, etc. In the same way, the horizontals of the multiselector C1 are connected to the verticals V1 of the multiselectors *b*1 to *b*8 etc....

The horizontal selection signals of table III are delivered in each selection stage by a selector comprising, for the stage T*a* for instance, the counter K*a* and the decoder S*a*. By means of these selectors which may be connected in series by the activation of the gate P12, one performs a cyclic selection of all the horizontals of the switching stage by applying a train of pulses G*t* at the input of the counter K*c*. One may also select, in any one of the stages T*a* and T*b*, a given horizontal in each one of the multiselectors by introducing, in the counters K*a* and K*b*, the corresponding codes C and C*b*. It will be noted that such a pair of codes identifies, by a matrix-type selection, one of the subscribers connected to the exchange since the code C*a* defines the horizontal in one of the multiselectors *a*1 to *a*16 and that the code C*b* defines one of these multiselectors *a*1 to *a*16.

The output stage Ty comprises 128 junctors which may be of three different types:

1—The local junctor comprising two junctors such as V101 and V1601 connected by the speech conductors and which enables the setting up of a connection between two subscribers.

2—The outgoing junctor such as V104 which enables the setting up of a connection between a subscriber and the outgoing trunk JC1.

3—The digit receiver V116 which is connected to a subscriber for the number reception.

All these types of junctors are connected to the centralized control circuit CP for performing data transfer operations. Thus, for instance, the digits decoded in the receiver V116 are transmitted to the circuit CP which stores them in a register.

FIG. 5 represents the logical circuit JL104 of the junctor V104 associated to the multiselector *c*1 of the selection stage T*c* as well as the multiselector *b*6 of the stage T*b*.

On this figure, one has shown a path set up through the switching circuits X*b*13 and X*c*46, the small letter characterizing—in these references—the selection stage, the first digit the number of the vertical and the second digit the number of the horizontal.

It will be noted that the links between *b*6 and *c*1 and between *c*1 and JL104 comprise two speech conductors drawn in plain lines and a selection conductor drawn in thin lines.

Figure 6:
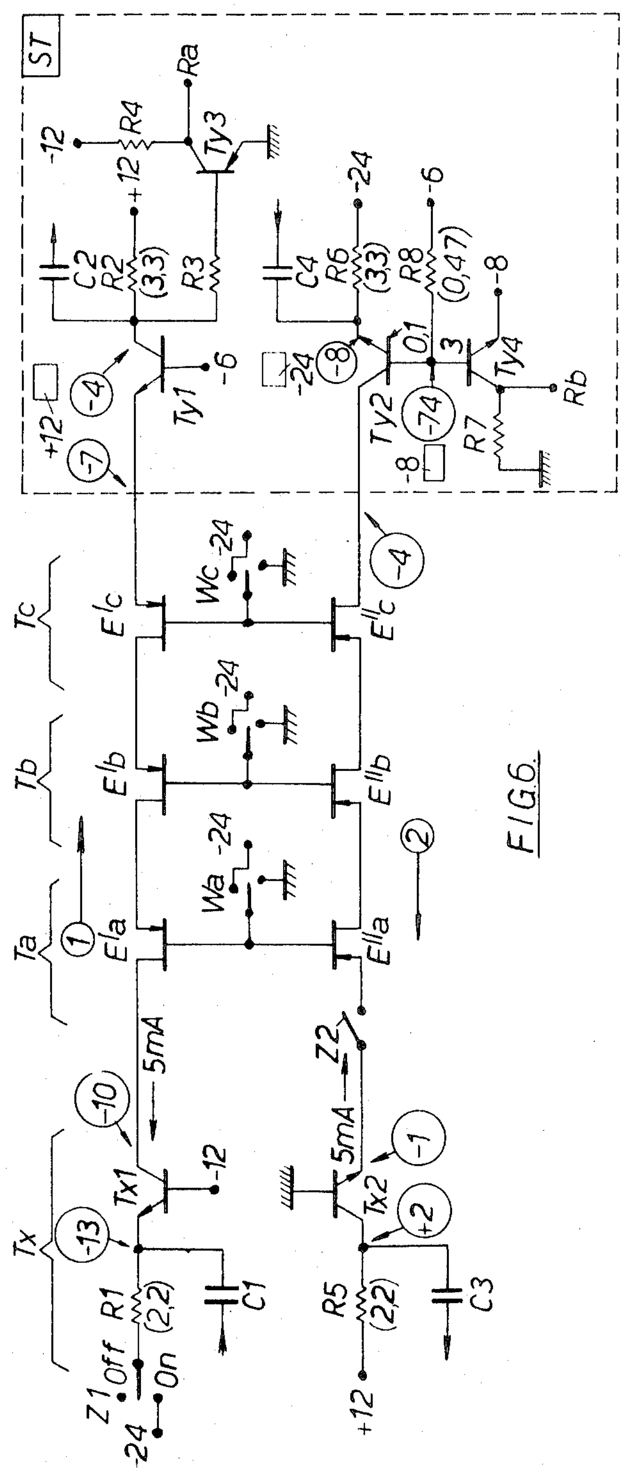
FIG. 6 represents the state detector.

The circuit JL104 comprises:

The state detector ST to which are connected the two speech conductors and which supplies a loop signal $\overline{Ra}$ and a path signal R*b* for the conditions shown in table IV. FIG. 6 shows the detailed diagram of this circuit ST.

TABLE IV: Operating conditions

| Designation | Signal | Condition |
|---|---|---|
| Loop signal | $\overline{Ra}$ | Off-hook condition |
| | R*a* | On-hook condition or normal connection or internal blocking |
| Path signal | R*b* | Path established between the junctor and a subscriber's set |
| | $\overline{Rb}$ | Nonestablished path |
| Answer signal | $Rb \times \overline{Ra}$ | Called subscriber which is free and can be connected |

The order control circuit DC comprising several logical circuits used for controlling the execution of the orders Q*a*, Q*b*, Q*c*, Q*d*. The logical conditions are shown in table VI.

FIG. 6 represents the detailed diagram of a path established between a subscriber's line and the state detector ST of a junctor of the output stage Ty. This path enables to set up a bidirectional speech connection from T*x* towards T*y* (arrow 1, MOS transistors E'*a*, E'*b*, E'*c*) and from Ty towards T*x* (arrow 2, MOS transistors E''*a*, E''*b*, E''*c*). The coupling between these MOS transistors and the stages Tx and Ty is carried out through bipolar transistors in common base configuration Tx1, Ty1, Tx2, Ty2. The holding flip-flops W of FIG. 1 have been shown symbolically by the changeover switches W*a*, W*b*, W*c* which apply to the grids either the ground potential (blocking of the transistors) or the potential −24 volts (conducting transistors).

The three MOS transistors of each chain are equivalent to a resistance of 600 ohms, for instance, when the switches are closed.

On the chain 1, supplied by −24 volts and +12 volts, the switch Z1 represents the hook of the set which is in the position "Off" when this latter is unhooked and in the position "On" when it is hooked. The chain 2 is supplied between +12 and −24 volts.

On this figure, the voltages shown in an oval are those present for each chain when the path is set up, and those shown in a rectangle are those present when this path is broken. Last, the numbers shown between brackets under a resistance represent the value of this latter in kΩ. It will be noted that, in order to avoid the decimals, it has been assumed that a conducting or saturated bipolar transistor had a base-emitter voltage drop of 1 volt.

The mode of elaboration of the signals R*a* and R b will now be described by choosing a value of direct current, in each chain, equal to 5 ma. when the path is set up this giving drain-source voltage drop of 1 volt per MOS transistor. One has also chosen a collector-to-emitter voltage equal to or higher than 3 volts for each bipolar transistor.

1—Elaboration of the signal R*a* (chain 1)

When the switch Z1 is in the "off" position, no current at all flows in the chain 1, and the collector of the transistor Ty1 is brought to +12 volts. The transistor Ty3 is thus blocked and its collector is brought to −12 volts (signal R*a*).

When Z1 is in the "on" position and when W*a*, W*b*, W*c* are closed, all the transistors of the chain 1 are conducting with the voltage values indicated. The collector potential of Ty1 is thus −4 volts assuring the saturation of Ty3 which has its collector grounded.

2—Elaboration of the signal R*b* (chain 2)

When the switch Z2 is open and the switches W*a*, W*b*, W*c* are grounded no current at all flows in the chain 1, but the base-emitter junction of the transistor Ty2 is conducting whereas the transistor Ty4 is blocked.

In fact, the bases of these two transistors are brought to −6 volts through the resistor R8 and the emitter of the transistor Ty2 is brought (through R6) to a potential much more negative than the emitter of the transistor Ty4 so that a current flows in the base-emitter junction of Ty2. The value of the potential of the bases is thus fixed at about −8 volts by the resistor bridge R6–R8, this assuring the blocking of Ty4 and the presence of a signal $\overline{Rb}$.

When the switches W*a*, W*b*, W*c* are in the upper position, all the transistors of the chain 2 are conducting with the indicated voltages and, if the transistor Tyyhas a gain $\beta$=50, its base current is 0.1 ma. for a chain current of 5 ma. Since Ty4 is blocked, the base current of Ty2 produces a voltage drop of 0.47×0.1≅volt in R8, viz a base voltage of approximately −5.95 volts which produces the saturation of Ty4 and the passage of the base voltage to −7 volts. A current of 2.1 ma. flows then through the resistor R8 of which 0.1 ma. is absorbed by Ty2 and the remainder by Ty4. One obtains thus a signal R*b* of amplitude −8 volts.

The order control circuit DC represented on FIG. 5 comprises the flip-flop M, the OR-circuits P1, P3, P8, P9 and the AND-circuits P2, P4, P5, P6, P7. The control signals of these logical circuits are of three types:

a.—The signals G*t* constituted by a train of pulses of period t, b.—The signals R*a* and R*b* defined previously, C.—The order signals Q*a*, Q*b*, Q*c*, Q*d* which are delivered by the centralized control circuit CP. These latter control the different operations performed during the processing of a call and which are grouped in column *a* of table V.

In order to execute one of the orders Q*b*, Q*c*, Q*d*, in a given junctor, the circuit CP selects this junctor and sends to it the order signal (table V, column *b*). These order signals are also applied to the switching stage (FIG. 4) for controlling the advance of the selectors K*a*, K*b*, K*c* by means of the AND-circuits P11, P12 and of the OR-circuit P13.

Thus, for the logical condition (Q*b*+Q*c*+Q*d*), the selector K*c* advances cyclically under the control of the signals G*t* as indicated table V (column *e*). The other two selectors K*a* and K*b* advance cyclically only for the order Q*c* (table V, columns *c* and *d*).

For the orders Q*b* and Q*d*, the horizontal selection in the stages T*a* and T*b* is performed under the control of the codes C*a* and C*b* sent by the circuit CP, the set of these two codes identifying—as it has been seen previously—one of the equipments of the input stage T*x*.

The selection signal of the vertical of the stage T*c* associated to the selected junctor is elaborated in the order control circuit DC the operation of which is summarized by the logical equations of table VI. In these logical equations, the sign "→" means that, when the logical equation indicated on the left-hand side is satisfied, the flip-flop M is set to the indicated state.

TABLE VI.—CONTROL CIRCUIT ORDER

| Reference | Logical condition | Gates |
|---|---|---|
| (1) | Qb+Qc+Qd→M | P3 |
| (2) | M.Gt=Mt | P2 |
| (3) | Mt+Qa=D4 | P1 |
| (4) | Qa.$\overline{\text{Rb}}$+Qb.Rb+Qc.$\overline{\text{Ra}}$+Qd.Ra.Rb=Xa | P4, P5, P6, P7, P8 |
| (5) | Xa+Xb→$\overline{\text{M}}$ | P9 |

Figure 7:
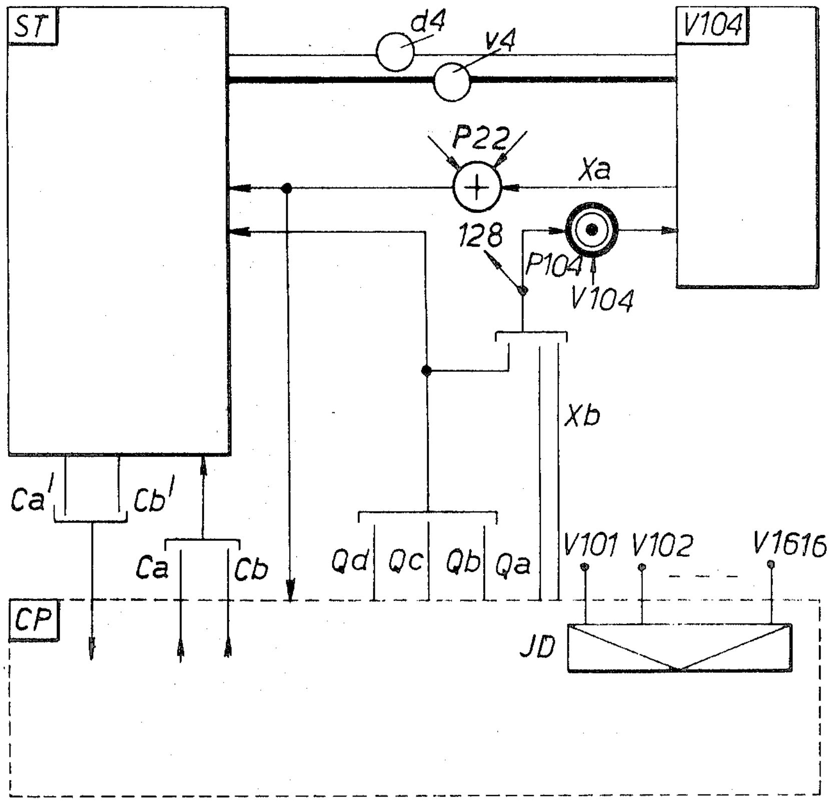
FIG. 7 represents the various connections between the junctors, the switching stage and the centralized control circuit.

FIG. 7 represents a general diagram of the exchange on which are represented the connections between the centralized control circuit CP, the switching stage ST which groups the selection stages T*a*, T*b*, T*c* and the input stage T*x* (see FIG. 4) as well as one of the junctors of the output stage T*y*, the junctor V104 for instance.

The junctor selection mentioned hereabove is carried out by means of the decoder JD comprising the outputs V101,...V104...V1616

When a signal appears on the output V104 at the same time as one of the order signals, this signal V104 activates the AND multiple circuit P104 (the stage T*y* comprises 128 gates of this type as indicated on the multiplexing arrow) and the order signal is transmitted to the circuit JL (FIG. 5) of the junctor V104. This signal is also transmitted, except for the order Q*a*, to the circuit ST in which it is applied first to the gates P12 and P13 (see FIG. 4) for controlling the cyclic selection during the performance of the order and second to the AND multiple circuits P14 and P15 used for transferring the codes stored in the counters K*a* and K*b* to the circuit CP at the end of an order Q*c* (see table V, column *i*).

The equation 4 of table VI gives the logical conditions for which an execution signal X*a* appears, i.e. a signal characterizing the fact that an order has been satisfactorily achieved. The outputs X*a* of all the junctors of the stage T*y* are connected to the inputs of the OR-circuit P22, the output of which is connected first to the AND multiple circuits P14, P15 (see FIG. 4) of the switching stage ST and second to the circuit CP.

It is possible that an order cannot be performed satisfactorily because of a defective circuit, of an internal blocking (orders Q*b*, Q*d*) or because its result is negative (order Q*d*, if the tested subscriber is on line). In order to detect these conditions, the circuit CP elaborates a signal X*b* which appears when the maximum time of allowed to the order is reached, the durations of the time delays being indicated in column *f* of table V. It will be noted that a signal X*b* is not associated to the call detection order since such an operation must be carried out cyclically in a permanent way. Nevertheless, provision can be made for an alarm signal appearing after a certain time of scanning without result and characterizing a fault in the circuits.

The signal X*b* is applied to the junctor V104 and controls the stopping of the operation as indicated by equation 5 of table VI.

The processing of the orders Q*a*, Q*b*, Q*c*, Q*d* will now be described.

In the circuit JL (FIG. 5) the gates P1 to P9 and the flip-flop M are made up, by way of example, with circuits such as an

TABLE V.—CALL PROCESSING

| Operation | Order | Horizontal selections: Stage Ta | Horizontal selections: Stage Tb | Horizontal selections: Stage Tc | Max duration | Vertical selection, Ud | End of operation: Logical cond. | End of operation: Codes transferred to CP |
|---|---|---|---|---|---|---|---|---|
| Release | Qa | ---------- | ---------- | ---------- | To | −U | $\overline{\text{Rb}}$ | |
| Path search | Qb | Ca | Cb | Cyclic | T3 | Mt | Rb | ---------- |
| Call detection | Qc | Cyclic | Cyclic | Cyclic | ---------- | Mt | $\overline{\text{Ra}}$ | Ca–Cb |
| Subscriber's test | Qd | Ca | Cb | Cyclic | T3 | Mt | Rb, Ra | ---------- |
| a | b | c | d | e | f | g | h | i |

output signal has a negative potential −U of amplitude 12 volts and that its complement is represented by the ground potential. It results therefrom that when the equation 3 of table VI is not satisfied (condition $\overline{D4}$), the vertical selection conductor *d*4 (FIG. 5) is grounded. As it has been seen during the study, in relation with the table II, of the control process of a switching circuit X*jk*, this signal assures the holding in the rest state of all the switching circuits associated to the vertical whatever may be the signals applied to the horizontal selection conductors of the multiselector.

1—Release order.

When a release order Q*a* is received from the circuit CP, the equation 3 is fulfilled and the conductor *d*4 is brought to the potential −U (signal D4) controlling the opening of the switching circuit associated to the vertical V4 which may be closed, and a free signal E of amplitude −U (see table I) appears on the conductor *e e*6 if no circuit at all is closed on the horizontal H6. It will be reminded that this conductor is connected to the vertical selection conductor *d*1 of the multiselector *b*6 of the stage T*b* (FIG. 4). This signal E controls thus the opening of the circuit X*b*13 in the manner described previously, and the opening of the cross-point which terminates this path in the selection stage T*a*: it is thus seen that it is enough to apply a signal Q*a* to a given junctor for controlling in a single operation, the release of the path set up between this junctor and an equipment of the stage T*x*. It will be set that the maximum duration of this operation is $To=2^0.t$, *t* being the duration of one period of the signals G*t* (see FIG. 8.*a*). The end of the time *To* is marked, as it has been seen previously, by a signal X*b* which controls the setting to the 0 state of the flip-flop M.

2—Cyclic selection orders.

As indicated in columns *c*, *d*, *e* of table V, the orders Q*b*, Q*c*, Q*d* control the cyclic section of the horizontals in the stages T*a*, T*b*, T*c*. For these orders the equations 2 and 3 show that the voltage on the conductor *d*4 is modulated by the signals G*t* between zero and −U volts as long as the equation 5 which controls the resetting of the flip-flop M is not satisfied.

The orders are performed in the following way:

2.1—Path search. This operation consists in setting up a path, through the selection stages T*a*, T*b*, T*c* between an input equipment and identification codes of which C*a*–C*b* are supplied by the circuit CP and a junctor, the junctor V104 for instance. It will be described in relation with the diagrams of FIGS. 8*a* to 8*j*.

Figures 8A, 8B, 8C, 8D, 8E, 8F, 8G, 8H, 8I, 8J:
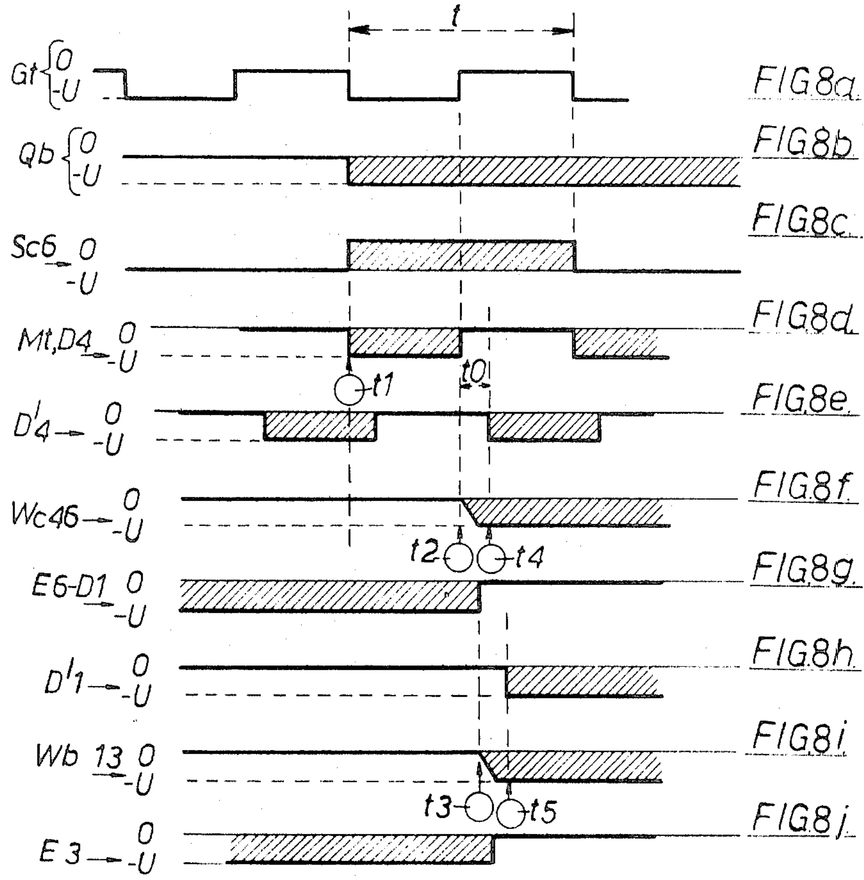

The order Q*b* (FIG. 8.*b*) controls the modulation by the signal M*t* (FIG. 8*d*), of the potential of the conductor *d*4, and the first time this conductor is brought to the potential −U, all the switching circuits associated to the vertical V4 receive a signal which resets their holding flip-flops W in the 0 state (see FIG. 1) so that this vertical is released (the signal present on the 1 output of the holding flip-flop W*c*46 of the circuit X*c*46 is shown on FIG. 8.*f*). It will be assumed that the decoder S*c* (FIG. 4) delivers at that time a selection signal $\overline{Sc6}$ of amplitude zero which starts at time *t*l (FIG. 8.*c*) in synchronism with the signal D4 of amplitude −U (FIG. 8.*d*). The delayed signal D'4 is shown on FIG. 8.*e* and it is assumed that the horizOntal H6 is free and that a free signal E6 is present on the conductor *e*6 (FIG. 8*g*). Between times *t*2 and *t*4 (FIG. 8*f*) the conductors *d*4 and *d*'4, associated to the vertical V4, are simultaneously grounded (signals $\overline{D4}$ and $\overline{D'4}$). At this moment, all the conditions required for the closing of the circuit X*c*46 are assembled (see table II, line *d*) and the holding flip-flop W*c*46 of this circuit sets to the 1 state (FIG. 8*f*) at the same time as the conductor *e*6 is grounded (FIG. 8*g*) which characterizes the fact that the horizontal H6 is now busy.

Since the conductor *e*6 of the multiselector *c*1 is connected to the conductor *d*l of the multiselector *b*6 (see FIG. 5) this potential constitutes the vertical selection signal of this multiselector in which it will be assumed that the horizontal H3 is free (signal E3, FIG. 8*j*) and that it is selected by the signal $\overline{Sb3}$ obtained by decoding the code C*b*.

Last, the potential of the conductor *d*'1 is shown in the FIG. 8*h*. It is thus seen that, by comparing the FIGS. 8*g*, 8*h* 8*j*, all the closing conditions of the circuit X*b*13 are present between the times *t*3 and *t*5 (FIG. 8*i*) and, in *t*5, the flip-flop W*b*13 sets in the 1 state and the circuit X*b*13 is closed.

In the selection stage T*a*, which is not shown on FIG. 5, the vertical selection signal is constituted by the potential of the conductor *e*3 and the horizontal selection signal is delivered by the decoding of the code C*a*.

Since one has to set up a path between the input equipment associated to this horizontal and the junctor V104, said horizontal is free and one has a free signal so that the corresponding switching circuit closes up in the stage T*a* and that the path is set up. The circuit ST (FIG. 5) delivers then a path signal R*b* and one has: $Qb \times Rb = Xa$ (equation 4, table VI).

As it has been seen above, the signal *Xa* controls the resetting to the 0 state of the flip-flop M (stopping of the modulation on the conductor *d*4) and it is transmitted to the circuit CP (FIG. 7) for controlling the suppression of the order *Qb*.

If no signal X*a* is obtained, the following signal G*t* controls the advance by one position of the selector K*c* which delivers thus a signal $\overline{Sc7}$ etc....

If no path is found out after the scanning of all the horizontals in the multiselector C1, i.e. after a duration of $T3=2^3.t$ (see table V, column *f*) the circuit CP sends a signal X*b* to the junctor (see FIG. 6) which controls the stopping of the scanning.

2.2—Call detection. This operation consists in scanning cyclically all the equipments of the stage T*x* (FIG. 4) in order to detect those which are calling. To this effect, one sets up a path between a junctor (V104 for instance) and each of the equipments, a calling equipment being characterized by the supply, by the circuit ST (FIG. 6) of a signal $\overline{Ra}$. As it may be seen on FIG. 4, the order Q*c* activates the gates P11 and P12, the cyclic advance of the counters K*c*, K*b*, K*a* which control thus the scanning of all the possible paths throughout the switching stage.

In the circuit JL (FIG. 5), the potential of the vertical selection conductor *d*4 is modulated as for the order Q*b* and, during a scanning cycle of the horizontals of the multiselector *c*l, the counters K*b* and K*a* show the codes C*a*' and C*b*' characterizing a subscriber. This cycle, of maximum duration 8*t*, enables thus to carry out a path search as with the order Q*b* for connecting the junctor to this subscriber. If this subscriber is calling, the circuit ST (FIG. 5) delivers a loop signal $\overline{Ra}$ so that a signal X*a* appears (equation 4, table VI) which activates the AND-circuits P14, P15 (FIG. 4) and controls the transfer of the identification codes C*a*', C*b*' (FIG. 7) to the circuit CP.

2.3—Subscriber's test. This operation consists in setting up a path between a subscriber the codes of which C*a*–C*b* are given by the circuit CP and a junctor in order to know if this subscriber is free or on line. This operation is thus identical to the path search and it is seen, according to table IV that a free subscriber is characterized by the logical condition R*b*.R*a*.

Since the cyclic scanning concerns only the counter K*c*, the maximum duration of the operation is $T3=8t$ and, at the end of this time, the circuit CP delivers a signal X*b* if the condition $Rb \times \overline{Ra}$ has not appeared, this signal controlling the stopping of the operation.

While the principles of the above invention have been described in connection with specific embodiments and particular modifications thereof it is to be clearly understood that this description is made by way of example and not as a limitation of the scope of the invention.

We claim:

1. A switching stage in which cross-points include metal oxide semiconductor transistors, said switching stage comprising an input stage, an output stage, and first and second and third selection stages placed between the input stage and the output stage, each of said stages including a plurality of multiselectors, each multiselector including a plurality of horizontals and verticals, and means connecting each multiselector horizOntal in each selection stage to a vertical of the preceding stage.

2. A switching stage as claimed in claim 1, in which the multiselectors in a selection stage include homologous selection horizOntals, and means connecting said homologous selection horizontals together to receive selection signals from a plurality of counters.

3. A switching stage as claimed in claim 1, in which a selected horizontal *k* is free in a selection stage, a switching circuit X*jk* at the intersection of this horizontal and of the vertical *j* is closed by modification of the voltage on a vertical selection conductor *dj*, a busy signal is supplied on the horizontal *k* and to a vertical of the preceding stage, whereby a path is set up in cascade between verticals selected in the selection stages and an equipment in the input stage identified by the horizontals in the selection stages.

4. A switching stage as claimed in claim 1, in which the switching stage is used in a telephone exchange, two speech conductors are used for obtaining signaling information of a first and a second type, where information of the first type indicates that the subscriber's station is "off-hook" and information of the second type indicates that the path is set up.

5. A switching stage as claimed in claim 1, including means for conducting a path search and a subscriber's test involving searching a path between an input stage identified by codes in a plurality of counters and a junctor connected to a vertical of the third selection stage, means for scanning all possible paths by cyclically advancing a counter associated with the third selection stage, and means for determining when the path is complete between a subscriber's set and the vertical of the third selection stage.

6. A switching stage as claimed in claim 5, in which the counters are connected in series in order to scan all the input equipments successively, and receipt of a selected signal indicates that the equipment identified by the code on the plurality of counters is calling.

* * * * *